(12) United States Patent
Vanderspurt et al.

(10) Patent No.: US 9,073,009 B2
(45) Date of Patent: Jul. 7, 2015

(54) AIR PURIFICATION SYSTEM

(75) Inventors: Thomas Henry Vanderspurt, Glastonbury, CT (US); James A. Davies, Manchester, CT (US); Stephen O. Hay, Tolland, CT (US); Timothy N. Obee, South Windsor, CT (US); Susanne M. Opalka, Glastonbury, CT (US); Di Wei, Ellington, CT (US)

(73) Assignee: CARRIER CORPORATION, Farmington, CT (US)

( * ) Notice: Subject to any disclaimer, the term of this patent is extended or adjusted under 35 U.S.C. 154(b) by 1676 days.

(21) Appl. No.: 12/302,615

(22) PCT Filed: May 31, 2007

(86) PCT No.: PCT/US2007/012856
§ 371 (c)(1),
(2), (4) Date: Nov. 26, 2008

(87) PCT Pub. No.: WO2007/143043
PCT Pub. Date: Dec. 13, 2007

(65) Prior Publication Data
US 2009/0246091 A1    Oct. 1, 2009

Related U.S. Application Data

(60) Provisional application No. 60/809,932, filed on Jun. 1, 2006.

(51) Int. Cl.
| | |
|---|---|
| *A62B 7/08* | (2006.01) |
| *B01D 53/88* | (2006.01) |
| *B01J 23/38* | (2006.01) |
| *B01J 35/00* | (2006.01) |

(52) U.S. Cl.
CPC ........ *B01D 53/885* (2013.01); *B01D 2255/802* (2013.01); *B01D 2259/804* (2013.01); *B01J 23/38* (2013.01); *B01J 35/0013* (2013.01); *B01J 35/004* (2013.01)

(58) Field of Classification Search
CPC .............................. B01J 23/38; B01J 35/0013
USPC .................................................. 422/123, 124
See application file for complete search history.

(56) References Cited

U.S. PATENT DOCUMENTS

| | | | | |
|---|---|---|---|---|
| 5,643,436 | A | * | 7/1997 | Ogawa et al. ................. 205/324 |
| 6,315,963 | B1 | * | 11/2001 | Speer ......................... 422/186.3 |
| 6,524,536 | B2 | | 2/2003 | Newman et al. |

(Continued)

FOREIGN PATENT DOCUMENTS

| | | | |
|---|---|---|---|
| CN | 1593755 A | | 3/2005 |
| JP | 11228873 A | * | 8/1999 |
| WO | WO2004112958 A1 | | 12/2004 |

OTHER PUBLICATIONS

English Translation of Japanese Document No. JP 11228873 A provided by the industrial property digital library: Kadoi, Kazuo; Titanium Dioxide Photocatalyst-Containing Coating Material Composition; Aug. 24, 1999.*

Official Search Report of the Patent Cooperation Treaty in counterpart foreign Application No. PCT/US07/12856 filed May 31, 2007.

European Search Report for International Application No. PCT/US2007012856, Sep. 29, 2010, 5 pages.

(Continued)

*Primary Examiner* — Kevin Joyner
(74) *Attorney, Agent, or Firm* — Cantor Colburn LLP

(57) ABSTRACT

An air purification system that comprises a substrate, and at least one layer of photocatalysts. The at least one layer of photocatalysts further comprise a plurality of metal clusters.

11 Claims, 5 Drawing Sheets

(56) References Cited

U.S. PATENT DOCUMENTS

| | | | |
|---|---|---|---|
| 6,992,042 B2* | 1/2006 | Hemme et al. | 502/350 |
| 2002/0098977 A1 | 7/2002 | Park et al. | |
| 2003/0050196 A1* | 3/2003 | Hirano et al. | 507/238 |
| 2005/0095189 A1 | 5/2005 | Brey et al. | |
| 2005/0129591 A1 | 6/2005 | Wei et al. | |

OTHER PUBLICATIONS

Zhang Qinghong et al., "Preparation of the Highly-Dispersed Pt/TiO2 and Photocatalytic Activity thereof", Journal of Chemistry, vol. 63, No. 1, p. 65-70, published on Jan. 31, 2005, Abstract Only—1 page.

* cited by examiner

US 9,073,009 B2

AIR PURIFICATION SYSTEM

CROSS-REFERENCE TO RELATED APPLICATION(S)

This application claims the benefit of PCT Application No. PCT/US2007/012856 filed May 31, 2007 entitled AIR PURIFICATION SYSTEM, which claims the benefit of U.S. Provisional Application No. 60/809,932, filed Jun. 1, 2006 entitled DEACTIVATION RESISTANT UV PHOTOCATALYSTS.

BACKGROUND OF THE DISCLOSURE

1. Field of the Disclosure

This disclosure relates generally to an air purification system. More specifically, the present disclosure relates to an air purification device or system comprising photocatalysts that resist or slow deactivation of the photocatalyst material.

2. Description of the Related Art

Buildings may utilize air purification systems to improve the quality of indoor air, thus enabling the building operator to decrease ventilation to the outdoor environment, create a cleaner indoor environment, or both. The quality of indoor air is often improved through air purification using gaseous contaminant removal technologies. Photocatalysis is a proven technology for removal of gaseous airborne substances such as volatile organic compounds (VOCs) including toluene, formaldehyde, and other contaminants from the air supply.

Photocatalytic air purifiers utilize a substrate or cartridge containing a photocatalyst, that interacts with airborne oxygen and water molecules to form hydroxyl radicals when placed under an appropriate light source. The radicals then attack the contaminants and initiate the oxidation reaction that converts them into less harmful compounds, such as water and carbon dioxide. It is further believed that the combination of water vapor, suitably energetic photons, and a photocatalyst also generates an active oxygen agent like hydrogen peroxide that can act over a distance of several microns from its source. This active agent also contributes to the oxidation of the organic contaminants.

Deactivation of the photocatalyst limits the effectiveness of photocatalytic air purifiers. Currently available systems have been found to exhibit a significant loss in catalytic ability over time. This can create significant expense for the operator of the air purification system, due to the labor and equipment costs associated with cleaning and/or replacing the photocatalyst cartridges.

Accordingly, there is a need for an air purification system or photocatalyst that can resist deactivation in general and/or can resist deactivation due to sudden and/or prolonged rises in contaminant concentration.

SUMMARY OF THE DISCLOSURE

The present disclosure provides an air purification system that comprises a substrate and at least one layer of photocatalysts. The photocatalysts further comprise a plurality of metal clusters. The metal clusters can comprise noble metals.

In one embodiment, the metal clusters are evenly dispersed throughout the photocatalyst layer. In another embodiment, the metal clusters are unevenly concentrated throughout the photocatalyst layer. The photocatalyst layer can also be coated with a layer of photocatalyst is arranged in a porous structure, and are coated with a layer of high surface area, suitably low mass transfer resistance material that is transparent to UV light.

The above-described and other features and advantages of the present disclosure will be appreciated and understood by those skilled in the art from the following detailed description, drawings, and appended claims.

DETAILED DESCRIPTION OF THE DISCLOSURE

Figure 1:
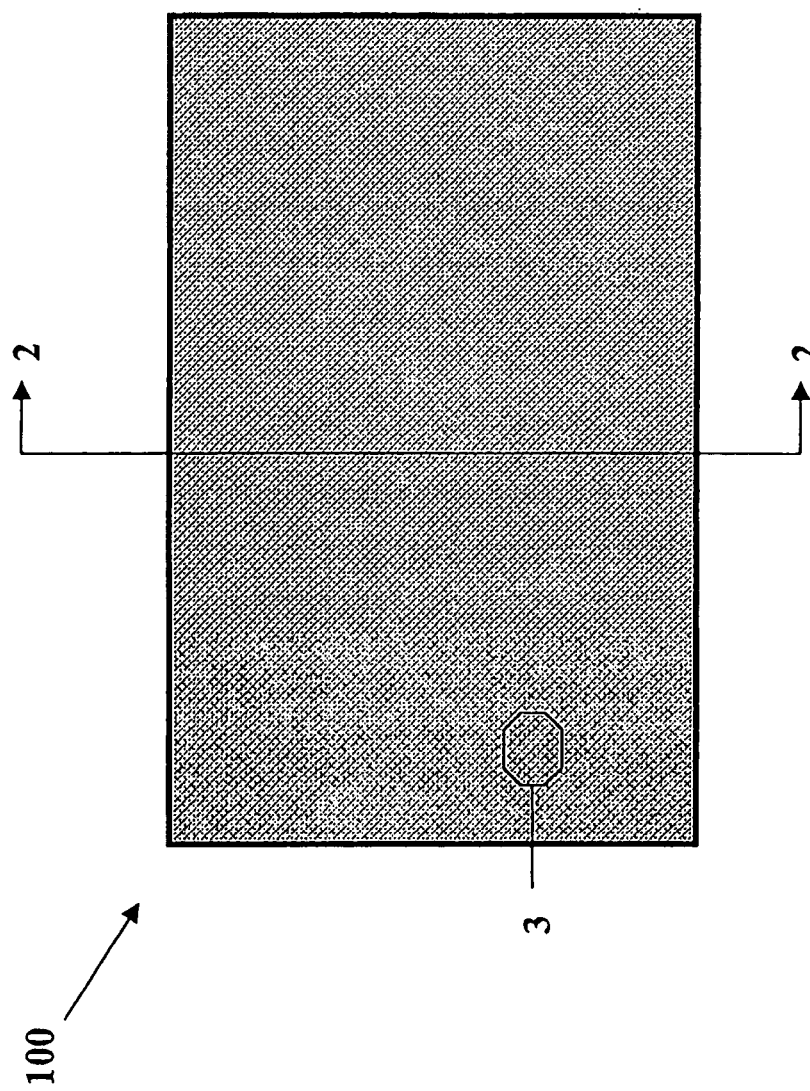
FIG. 1 shows a top view of an exemplary embodiment of a honeycomb structure that can be used as a substrate in the air purification unit of the present disclosure.

The air purification units of the present disclosure comprise a substrate that has a plurality of photocatalysts disposed thereon. These photocatalysts can be loaded with a plurality of metal rafts or clusters, in the manner described below. These metal clusters will prevent the photocatalysts from being overwhelmed during episodic concentration spikes of VOCs or prolonged high concentrations of the VOCs, whether the light source is on or off.

It has been discovered by the present disclosure that the photocatalysts can be overwhelmed by organic contaminants such as ethanol, iso-propanol, and others that have a high affinity for the catalytic surface, or by gaseous compounds that, when oxidized, form a compound or moiety that blocks an active site on the catalyst permanently. This compound can not be removed unless acted on by an outside agent, such as with a cleaner, or by scraping the compound off the photocatalyst surface.

When the VOC concentration is very high when the light source is on, these concentrations may be too high for the photocatalysts to keep up with, and/or the photocatalysts are not able to interact with airborne water molecules to create sufficient hydroxyl radicals to keep active sites available for further reactions. This phenomenon may also occur when the VOC concentration is elevated for an extended period of time with the light source turned off. The contaminants may then react with each other to form a varnish, which occupies the photocatalyst sites and blocks the ability of the photocatalysts to oxidize the contaminants.

The metal clusters of the present disclosure are to be deployed in photocatalysts for the decomposition or mineralization of VOCs, to ensure that the photocatalysts are not prematurely deactivated and spent. The clusters enable additional surface reactions that can take place during episodic spikes in contaminant concentration or when the light source is turned off, and enhance the oxidative destruction of high molecular weight organic surface contaminants that otherwise would inhibit or poison the normal photocatalytic oxidation by blocking of the photocatalyst surface sites. Such episodes would typically involve sudden rises in concentration of contaminants, e.g., to approximately 10 parts per million (ppm), where the photocatalyst would otherwise operate at a contaminant level of approximately 1 ppm. The clusters can also oxidize contaminants in the absence of light, unlike the photocatalysts. The metal clusters are designed to retard or prevent the deactivation of the photocatalyst by organic contaminants, through the processes discussed in further detail below.

Thus, in the present disclosure, the catalytic oxidation activity of very highly dispersed metal clusters can have a strong impact on breaching any organic varnish or overlayer caused by exposure of the photocatalyst to concentrations of organic vapors greater than the photocatalyst can readily oxidize. Furthermore, this oxidative activity can continue when the air purification unit is shut down and the light source is turned off. This is important because when the unit is restarted the cleaned photocatalytic sites in the neighborhood of the metal particles create active oxygen species that can attack the organic varnish between the metal particles.

Figure 2:
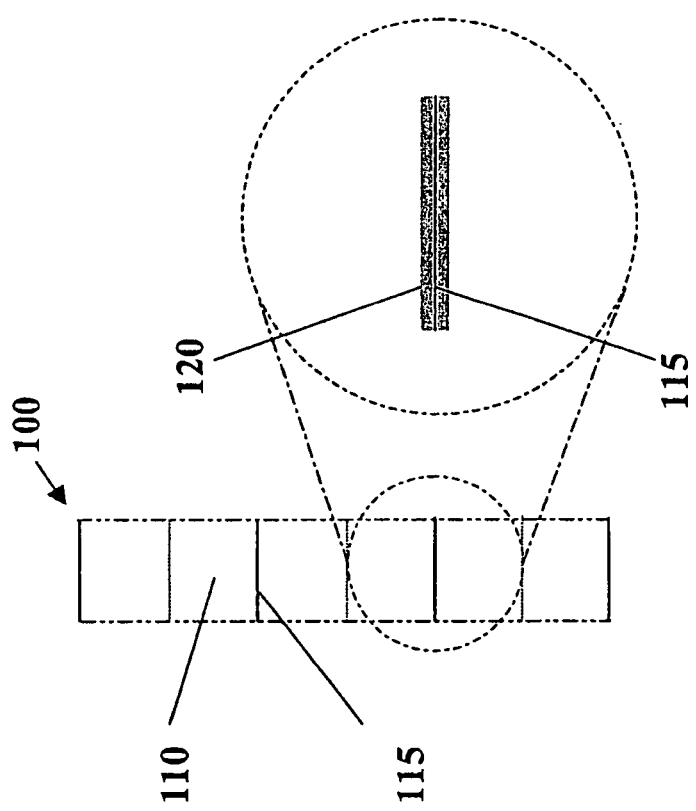
FIG. 2 shows a sectional view taken along line 2-2 of FIG. 1.
Figure 3:
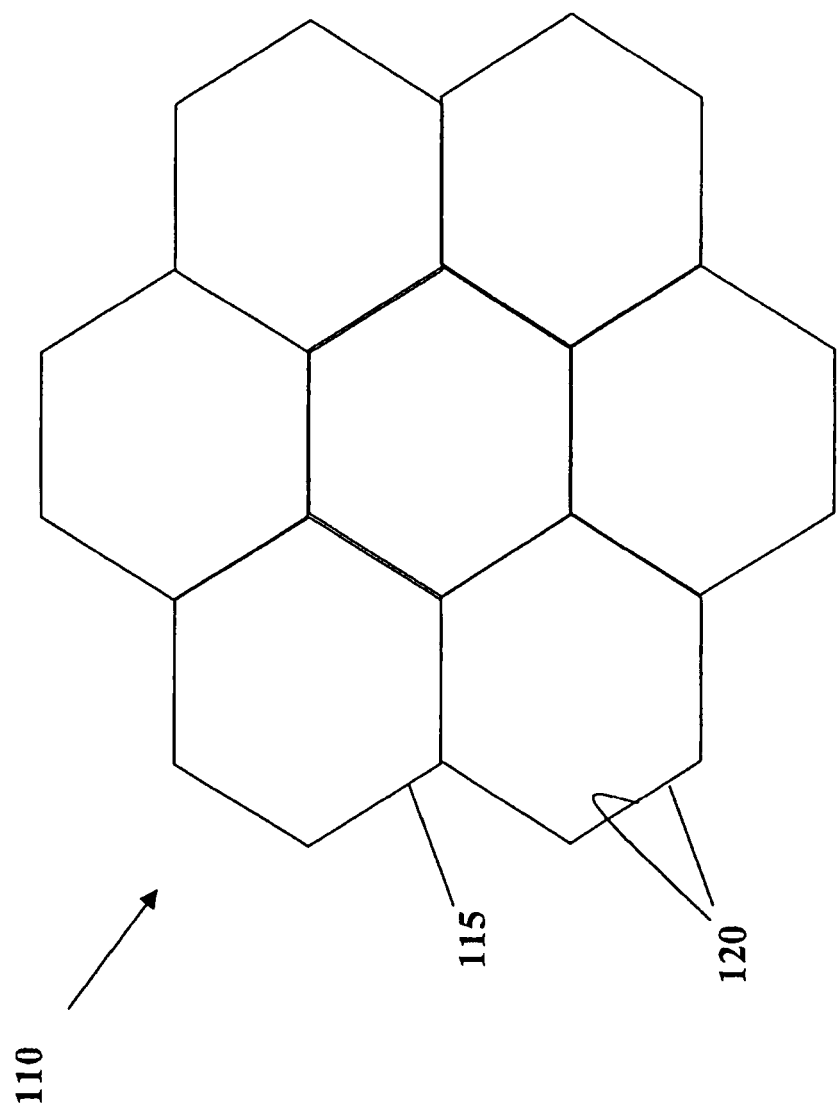
FIG. 3 is an expanded view of circle 3 of FIG. 1.

Deactivation resistant photocatalysts can be formulated by layering or otherwise positioning one or more photocatalysts on a suitable substrate. Referring to FIGS. 1-3, a honeycomb substrate 100 comprising a plurality of hexagonal cells 110 is shown. Cells 110 have cell walls 115. Each side of the cell walls 115 is coated with a layer of photocatalyst 120. The hexagonal design tends to be the most cost effective, but square, rectangular or triangular cells can also be used. The substrate 100 is ideally comprised of a thin, low cost material that resists degradation by ultraviolet (UV) light and air with a surface capable of bonding with the photocatalytic material. In the preferred embodiment, the substrate 100 is formed of aluminum. The present disclosure, however, contemplates the use of any other suitable materials that would be able to hold a photocatalyst for the substrate.

Figure 4:
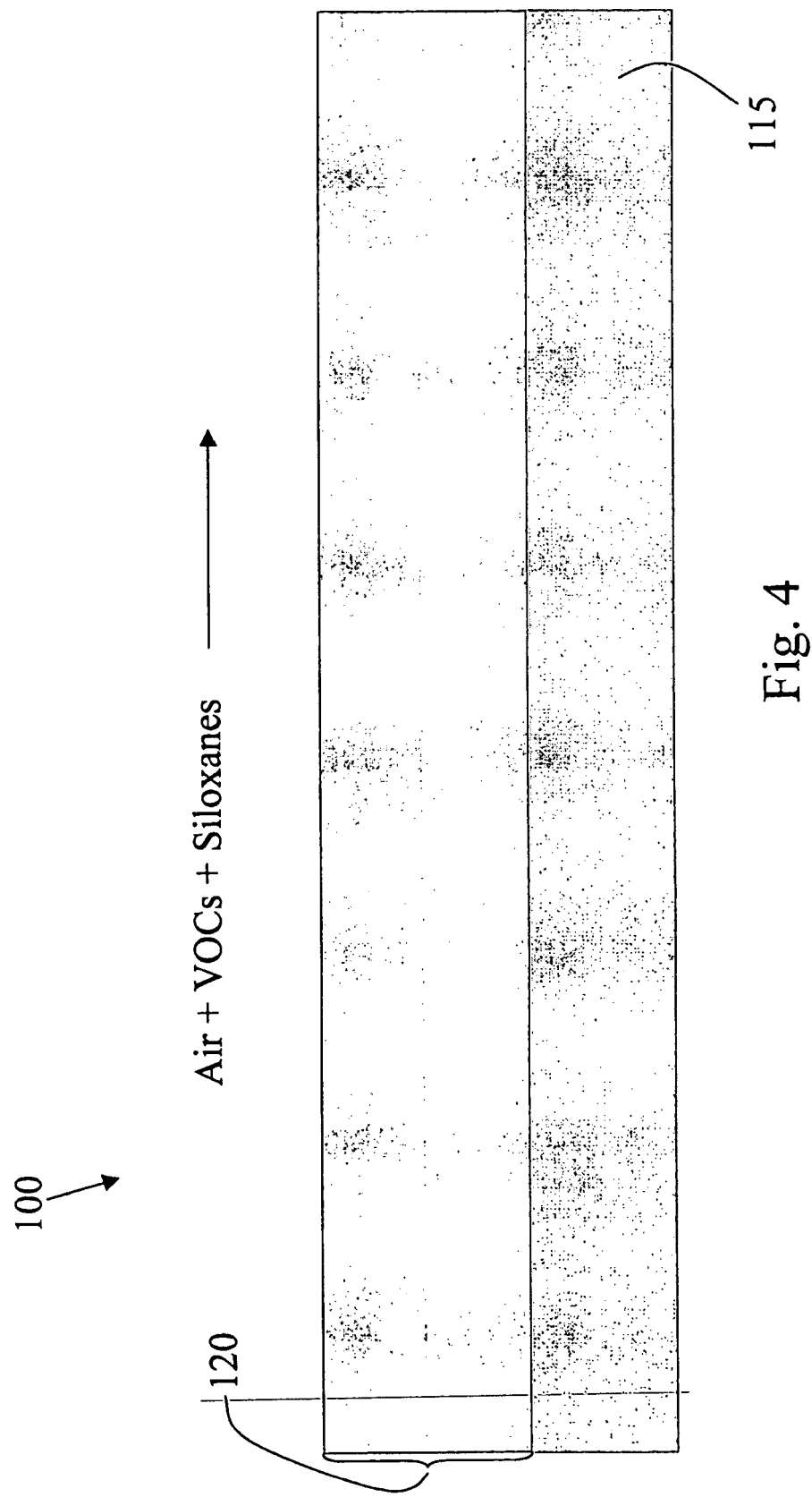
FIG. 4 shows an air purification system with an exemplary embodiment of a photocatalyst layer of the present disclosure.
Figure 5:
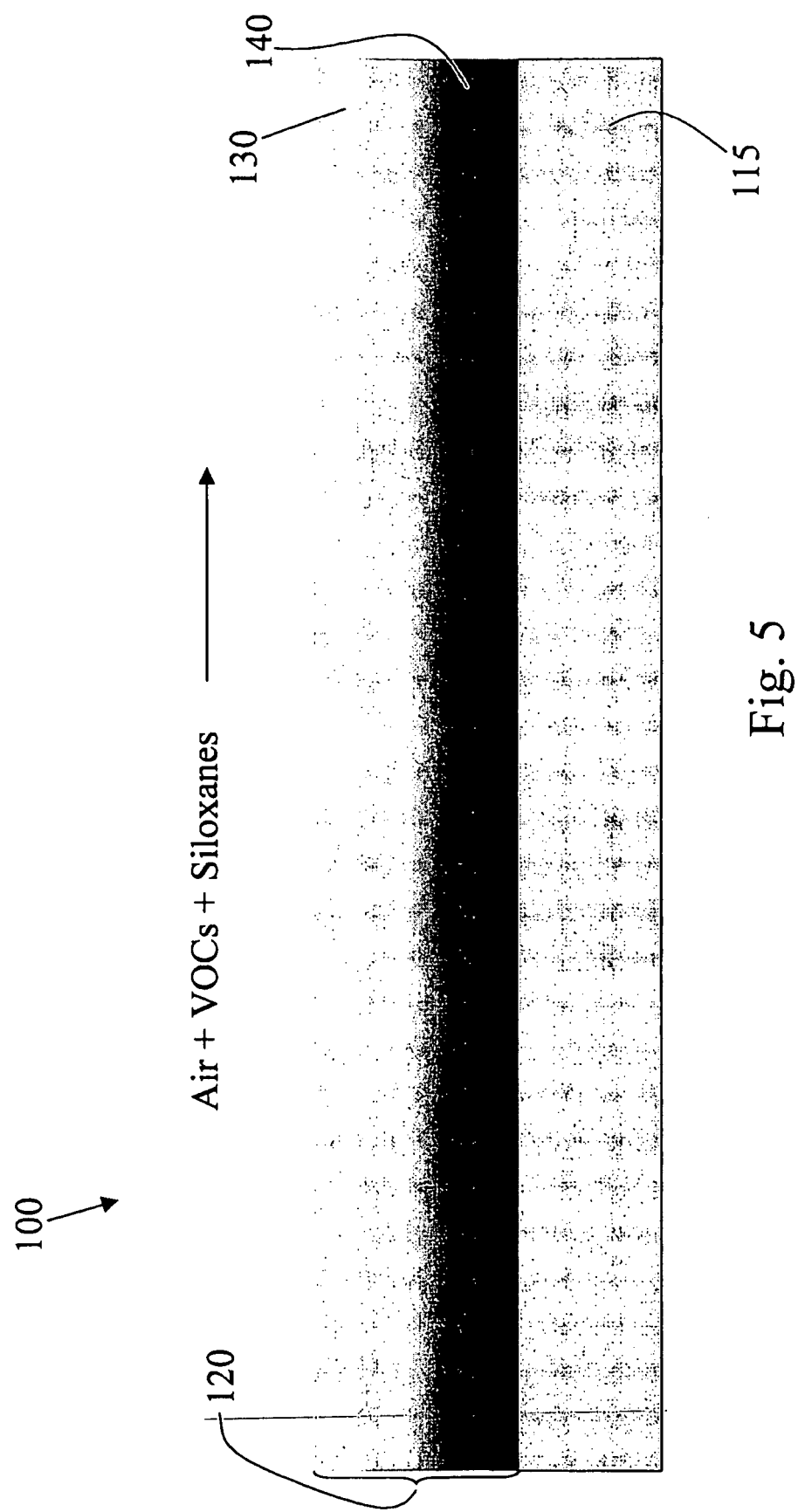
FIG. 5 shows an air purification system with a second exemplary embodiment of a photocatalyst layer of the present disclosure.

Referring to FIGS. 4 and 5, expanded views of the honeycomb substrate 100 having a cell wall 115 and a layer of photocatalysts 120 are shown. The sub-nanoscale noble metal clusters on the surface of the photocatalyst are preferably present in a small amount. Since the clusters absorb light, the concentration of the clusters at a particular depth from the surface of the photocatalyst exposed to the light source must be calibrated so that the light absorption due to metal rafts does not prevent sufficient light from reaching the photocatalyst. The amount of metal clusters present in the photocatalyst layer 120 is preferably about 1% or less by weight overall. This concentration can be substantially uniform throughout the photocatalyst layer 120, as is shown in FIG. 4, or can be graded or otherwise non-uniform, as is shown in FIG. 5.

In the embodiment shown in FIG. 4, the metal clusters can be present in an amount of approximately 0.1% by weight throughout the entire photocatalyst layer 120. In the embodiment shown in FIG. 5, the metal clusters are concentrated from about 0.1% by weight to about 0.3% by weight in a region 130 nearest the surface of photocatalyst layer 120 exposed to ambient air and a light source, and from about 1.5% by weight to about 2% by weight in a second region 140 nearest the substrate wall 115. In this embodiment, the photocatalyst layer 120 can be 6 micrometers deep, and region 130 and second region 140 can be 0.5 micrometers deep.

Light is introduced to the photocatalyst layer 120 in a manner well known to those skilled in the art of photocatalysis. The light source used in the present disclosure is preferably a UV light source.

In either of the embodiments of FIGS. 4 and 5, the cluster concentration is preferably selected so that about 25% of the vapor phase active oxygen compound (e.g., hydrogen peroxide) released by the photocatalyst should survive long enough to react with any carbonaceous layer formed by the elevated VOC concentration. This will depend on the affinity of the particular metal selected for the active oxygen compounds released by the photocatalyst. The level of VOCs present in the air and the severity of the environment are also important factors in determining the concentration of clusters in the photocatalyst.

The preferred photocatalyst for the present disclosure is titanium dioxide, such as but not limited to Degussa P25. The photocatalyst can also include suitably doped titanium dioxide, where the dopant increases its photocatalytic activity, and metal oxide grafted titanium dioxide catalysts such as but not limited to tungsten oxide grafted titanium dioxide. The present disclosure also contemplates the use of other photocatalysts, such as, but not limited to, zinc oxide, tin oxide, or any mixture of titanium, zinc, and tin oxides.

The deposition of nanoscale metal clusters on the photocatalyst crystals (before they are layered on cell walls 115 of substrate 100) can be by chemical means and/or from colloidal solutions, although other deposition processes are also contemplated by the present disclosure. The chemical methods for applying the metal clusters to the photocatalyst crystals can include introducing a precursor that is a metal salt or complex, such as $H_2PtCl_6$, $[(NH_3)_4Pt](NO_3)$, $H_2AuCl_4$, or other suitable compounds, to the photocatalyst by any of the methods well known to those skilled in the art. These methods may include dissolving the precursor in a suitable solvent like water or an appropriate organic solvent, adjusting the pH, blending with photocatalytic powder, drying, optionally calcining and also optionally reducing in a hydrogen containing atmosphere, and passivating. A solution of a suitable dispersion aid, such as but not limited to triethanol amine or tartaric acid, may be used either before or during the contacting of the photocatalytic powder with the solution of the metal precursor. More than one metal may be introduced either at the same time or sequentially. These steps, calcination, reduction, and passivation are well known to those skilled in the art to convert the metal salt or complex to highly dispersed metal clusters on the photocatalyst surface.

Alternatively, pre-formed nanosized metal or mixed metal clusters as colloidal suspensions can be applied to the photocatalytic powder. The photocatalysts, and metal clusters in suspension, can be oppositely charged and mixed, so that the clusters are uniformly dispersed onto the photocatalyst crystals. To aid the uniform dispersion of these nanosized clusters, the photocatalytic powder may first be treated with ammonium citrate, critic acid or gelatin solution and the like. Before contacting the photocatalytic crystals with the colloidal suspension, methods for depositing such metal clusters onto photocatalyst crystals include, but are not limited to, those discussed above, and are well known in the art.

The metals used for the clusters can be any of the noble metals. Preferably, gold, platinum, palladium, or any mixture thereof is used. The clusters can be two nanometers or less wide. The clusters are also preferably three atomic layers or less thick. The photocatalyst layer 120 should be porous and have a low mass transfer resistance, so that the noble metal clusters are exposed.

When the photocatalyst layer 120 is not exposed to UV illumination and experiences a prolonged rise in contaminant concentration, the noble metal clusters have the ability to oxidize the contaminants through the process described below. This process leaves the photocatalyst sites within layer 120 free, so that when the photocatalyst layer 120 is again exposed to UV illumination, it is able to form hydroxyl radicals and oxidize any contaminants that have built up on the layer 120.

The addition of noble metal clusters to the photocatalyst compositions promotes additional reaction pathways to counter the blocking of photocatalyst sites by organic contaminants though two important mechanisms: 1) serving as an active site for oxygen adsorption, even in the absence of UV illumination, and 2) serving as an electronic trap to promote superoxide radical $O_2^-$ formation. While oxygen adsorbents and the superoxide radicals formed may not be as important for promoting oxidative decomposition reactions as hydroxyl radicals, they can play an important role in mitigating condensation reactions of contaminants that occur on acidic or basic oxide surfaces or under the influence of UV radiation, and can also help in the formation of hydrogen peroxide. The noble metal clusters will promote the adsorption and dissociation of active oxygen that can migrate to the oxide surface to react with and oxidize away the organic contaminant over-layer that would otherwise deactivate the photocatalyst.

Through a judicious choice of the metal for the clusters, the single pass efficiencies for formaldehyde and carbon monoxide may be increased, while a different choice of metal may be more efficient for oxidizing aromatics. For example, gold or gold mixed metal clusters have been found to be especially efficient at oxidizing carbon monoxide or formaldehyde, and platinum or other platinum group based clusters have been found to be especially efficient at aromatic oxidation.

When gold or gold mixed metal clusters are used, it is desirable that the photocatalysts be formulated with an effective amount of gold anchoring agent, typically about 2% or less by atomic ratio. This helps to prevent the metal cluster from drifting around the photocatalysts and merging with other clusters. Gold anchoring agents include, but are not limited to, iron. In this embodiment, if the photocatalyst is titanium dioxide, it would be described by the formula $Ti_{(1-x)}Fe_xO_y$, where x is from 0.001 to 0.02, and y is the appropriate value to balance the charge of the positive $Ti^{+4}$ and $Fe^{+3}$ species. The value of x has an upper limit that is inversely related to photocatalyst crystallite size, with the smaller crystallite being able to tolerate a larger value of x. Excess dopant can have a severe negative effect on the photocatalytic activity.

In addition, the features of the present disclosure can be used in conjunction with air purification systems and methods that can be utilized when silicone based contaminants, for example siloxanes, are present. These systems and methods are described in the co-pending application entitled "DEACTIVATION RESISTANT PHOTOCATALYSTS," which has was filed on May 31, 2007, assigned International Publication No. PCT/US2007/012855, and is herein incorporated by reference. The photocatalysts can thus be arranged in a porous structure, and can be coated with a layer of a high surface area, small aggregate size, suitably low mass transfer resistance material that is transparent to UV light, such as, for example, certain fumed silicas. This material can prevent the silicon compounds from reaching the photocatalyst surface, which allows the photocatalysts to properly oxidize VOCs.

While the instant disclosure has been described with reference to the above exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An air purification system, comprising:
   a substrate; and
   at least one layer of photocatalysts, comprising a plurality of metal clusters;
   wherein the plurality of metal clusters are present in a lower concentration in a first region of the at least one layer of photocatalysts than in a second region of the at least one layer of photocatalysts, wherein said first region is exposed to ambient air.

2. The air purification system of claim 1, wherein the substrate is an aluminum honeycomb.

3. The air purification system of claim 2, wherein the photocatalyst is titanium dioxide, doped titanium dioxide, metal oxide grafted titanium dioxide, zinc oxide, tin oxide, or any mixture thereof, and wherein the doped titanium dioxide has a dopant that increases the photocatalyst's activity.

4. The air purification system of claim 3, wherein the photocatalyst comprises doped titanium dioxide, wherein said doped titanium dioxide has a dopant that increases the photocatalytic activity of said doped titanium dioxide when compared to titanium dioxide.

5. The air purification system of claim 1, wherein the plurality of metal clusters comprises one or more noble metals.

6. The air purification system of claim 1, wherein the plurality of metal clusters comprises gold or gold mixed metal, and wherein the at least one layer of photocatalysts comprises about 2% or less by atomic ratio of an anchoring agent.

7. The air purification system of claim 6, wherein the anchoring agent is iron.

8. The air purification system of claim 1, wherein the plurality of metal clusters are present in an amount of about 0.1% to about 0.3% by weight in said first region, and wherein the plurality of metal clusters are present in an amount of about 1.5% to about 2% in said second region.

9. The air purification system of claim 1, wherein the plurality of metal clusters have a width of about 2 nanometers or less, and have a depth of 3 or fewer atomic layers.

10. The air purification system of claim 1, wherein the at least one layer of photocatalyst is arranged in a porous structure, and are coated with a layer of fused silica.

11. The air purification system of claim 1, wherein the at least one layer of photocatalyst comprises photocatalyst crystals, the plurality of metal clusters being deposited on the photocatalyst crystals before the photocatalyst crystals are applied to the substrate.

* * * * *